United States Patent
Murayama et al.

(10) Patent No.: US 10,345,766 B2
(45) Date of Patent: Jul. 9, 2019

(54) ENERGY MANAGEMENT SERVER, ENERGY MANAGEMENT METHOD, AND MEDIUM

(71) Applicant: KABUSHIKI KAISHA TOSHIBA, Minato-ku (JP)

(72) Inventors: Dai Murayama, Musashino (JP); Masaaki Saito, Tokyo (JP); Masahiko Murai, Hachioji (JP); Yutaka Iino, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 523 days.

(21) Appl. No.: 14/025,042

(22) Filed: Sep. 12, 2013

(65) Prior Publication Data
US 2014/0163757 A1    Jun. 12, 2014

Related U.S. Application Data

(63) Continuation of application No. PCT/JP2013/067707, filed on Jun. 27, 2013.

(30) Foreign Application Priority Data

Dec. 11, 2012  (JP) ................................ 2012-270349

(51) Int. Cl.
    *G05B 15/02*  (2006.01)
(52) U.S. Cl.
    CPC ............... *G05B 15/02* (2013.01); *Y02P 80/11* (2015.11)
(58) Field of Classification Search
    CPC ....... H02J 3/14; Y02B 70/3225; G05B 15/02; Y02P 80/11; G06Q 50/06
    (Continued)

(56) References Cited

U.S. PATENT DOCUMENTS 8,024,073 B2   9/2011  Imes et al.
8,082,065 B2  12/2011  Imes et al.
(Continued)

FOREIGN PATENT DOCUMENTS

JP   2005-92827    4/2005
JP   2005-157685   6/2005
(Continued)

OTHER PUBLICATIONS

Office Action dated Dec. 1, 2015 in Japanese Patent Application No. 2012-270349 (with English language translation).
(Continued)

*Primary Examiner* — Robert E Fennema
*Assistant Examiner* — Jigneshkumar C Patel
(74) *Attorney, Agent, or Firm* — Oblon, McClelland, Maier & Neustadt, L.L.P.

(57) ABSTRACT

According to an embodiment, server includes estimator, condition setter, calculator, receiver, and controller. Estimator estimates an energy demand in building where electrical apparatuses are equipped based on apparatus data. Condition setter sets energy consumption suppression conditions. Calculator calculates operation schedule of apparatuses which can optimize an energy balance in building based on the demand and condition. Receiver receives DR signal including energy consumption suppression condition. Controller controls the apparatuses based on operation schedule calculated based on the condition corresponding to that included in the DR signal.

23 Claims, 10 Drawing Sheets

(58) Field of Classification Search
USPC .................................................. 700/291
See application file for complete search history.

(56) References Cited

U.S. PATENT DOCUMENTS

| | | | |
|---|---|---|---|
| 8,099,195 B2 | 1/2012 | Imes et al. | |
| 8,108,076 B2 | 1/2012 | Imes et al. | |
| 8,156,683 B2 | 4/2012 | Slotnick | |
| 8,174,381 B2 | 5/2012 | Imes et al. | |
| 8,396,602 B2 | 3/2013 | Imes et al. | |
| 8,396,604 B2 | 3/2013 | Imes et al. | |
| 8,412,382 B2 | 4/2013 | Imes et al. | |
| 8,428,782 B2 | 4/2013 | Imes | |
| 8,442,695 B2 | 5/2013 | Imes et al. | |
| 8,457,797 B2 | 6/2013 | Imes et al. | |
| 8,457,802 B1 | 6/2013 | Steven et al. | |
| 8,473,109 B1 | 6/2013 | Imes et al. | |
| 8,498,748 B2 | 7/2013 | Murai et al. | |
| 8,498,749 B2 | 7/2013 | Imes et al. | |
| 8,504,180 B2 | 8/2013 | Imes et al. | |
| 8,509,954 B2 | 8/2013 | Imes et al. | |
| 8,532,808 B2 | 9/2013 | Drees et al. | |
| 8,532,839 B2 | 9/2013 | Drees et al. | |
| 8,571,518 B2 | 10/2013 | Imes et al. | |
| 8,600,556 B2 | 12/2013 | Nesler et al. | |
| 8,600,564 B2 | 12/2013 | Imes et al. | |
| 8,626,344 B2 | 1/2014 | Imes et al. | |
| 8,731,724 B2 | 5/2014 | Drees et al. | |
| 2003/0189420 A1* | 10/2003 | Hashimoto | H02J 3/008 323/212 |
| 2009/0055520 A1* | 2/2009 | Tabata | G06F 1/3221 709/223 |
| 2010/0100253 A1* | 4/2010 | Fausak | G01D 4/002 700/295 |
| 2010/0217550 A1 | 8/2010 | Crabtree et al. | |
| 2010/0218108 A1 | 8/2010 | Crabtree et al. | |
| 2010/0324962 A1* | 12/2010 | Nesler | G01R 21/133 705/7.36 |
| 2010/0332373 A1 | 12/2010 | Crabtree et al. | |
| 2011/0015802 A1 | 1/2011 | Imes | |
| 2011/0040666 A1 | 2/2011 | Crabtree et al. | |
| 2011/0046792 A1 | 2/2011 | Imes et al. | |
| 2011/0046798 A1 | 2/2011 | Imes et al. | |
| 2011/0046799 A1 | 2/2011 | Imes et al. | |
| 2011/0046800 A1 | 2/2011 | Imes et al. | |
| 2011/0046801 A1 | 2/2011 | Imes et al. | |
| 2011/0047418 A1 | 2/2011 | Drees et al. | |
| 2011/0051823 A1 | 3/2011 | Imes et al. | |
| 2011/0054699 A1 | 3/2011 | Imes et al. | |
| 2011/0054710 A1 | 3/2011 | Imes et al. | |
| 2011/0060476 A1 | 3/2011 | Iino et al. | |
| 2011/0061015 A1 | 3/2011 | Drees et al. | |
| 2011/0083358 A1 | 4/2011 | Slotnick | |
| 2011/0130886 A1 | 6/2011 | Drees et al. | |
| 2011/0173542 A1 | 7/2011 | Imes et al. | |
| 2011/0178977 A1 | 7/2011 | Drees | |
| 2011/0202185 A1 | 8/2011 | Imes et al. | |
| 2011/0214060 A1 | 9/2011 | Imes et al. | |
| 2011/0224838 A1 | 9/2011 | Imes et al. | |
| 2011/0246898 A1 | 10/2011 | Imes et al. | |
| 2011/0257911 A1 | 10/2011 | Drees et al. | |
| 2011/0270459 A1 | 11/2011 | Murai et al. | |
| 2011/0307101 A1 | 12/2011 | Imes et al. | |
| 2012/0022700 A1 | 1/2012 | Drees et al. | |
| 2012/0023225 A1 | 1/2012 | Imes et al. | |
| 2012/0046859 A1 | 2/2012 | Imes et al. | |
| 2012/0064923 A1 | 3/2012 | Imes et al. | |
| 2012/0072033 A1 | 3/2012 | Imes et al. | |
| 2012/0084063 A1 | 4/2012 | Drees et al. | |
| 2012/0093141 A1 | 4/2012 | Imes et al. | |
| 2012/0101637 A1 | 4/2012 | Imes et al. | |
| 2012/0109394 A1* | 5/2012 | Takagi | G05B 15/02 700/291 |
| 2012/0135759 A1 | 5/2012 | Imes et al. | |
| 2012/0215725 A1 | 8/2012 | Imes et al. | |
| 2012/0221718 A1 | 8/2012 | Imes et al. | |
| 2012/0252430 A1 | 10/2012 | Imes et al. | |
| 2012/0259583 A1 | 10/2012 | Noboa et al. | |
| 2012/0290142 A1* | 11/2012 | Lee | H04L 12/66 700/291 |
| 2012/0296482 A1 | 11/2012 | Steven et al. | |
| 2012/0323390 A1* | 12/2012 | Kobayasi | H02J 3/14 700/295 |
| 2012/0324119 A1 | 12/2012 | Imes et al. | |
| 2013/0038379 A1 | 2/2013 | Chen | |
| 2013/0038820 A1 | 2/2013 | Chen | |
| 2013/0060387 A1 | 3/2013 | Imes et al. | |
| 2013/0167035 A1 | 6/2013 | Imes et al. | |
| 2013/0173027 A1 | 7/2013 | Imes et al. | |
| 2013/0173075 A1 | 7/2013 | Mitsumoto et al. | |
| 2013/0204443 A1 | 8/2013 | Steven et al. | |
| 2013/0212262 A1 | 8/2013 | Imes et al. | |
| 2013/0227126 A1 | 8/2013 | Imes et al. | |
| 2013/0238160 A1 | 9/2013 | Imes et al. | |
| 2013/0245847 A1 | 9/2013 | Steven et al. | |
| 2013/0318217 A1 | 11/2013 | Imes et al. | |
| 2013/0318444 A1 | 11/2013 | Imes et al. | |
| 2013/0325190 A1 | 12/2013 | Imes et al. | |
| 2013/0332000 A1 | 12/2013 | Imes et al. | |
| 2013/0346139 A1 | 12/2013 | Steven et al. | |
| 2014/0039709 A1 | 2/2014 | Steven et al. | |
| 2014/0039965 A1 | 2/2014 | Steven et al. | |
| 2014/0042811 A1* | 2/2014 | Myamoto | H02J 3/383 307/31 |
| 2014/0058568 A1 | 2/2014 | Imes et al. | |
| 2014/0067142 A1 | 3/2014 | Steven et al. | |
| 2014/0128001 A1 | 5/2014 | Imes et al. | |
| 2014/0136005 A1 | 5/2014 | Drees et al. | |
| 2014/0142760 A1 | 5/2014 | Drees et al. | |
| 2014/0156097 A1 | 6/2014 | Nesler et al. | |
| 2014/0207304 A1* | 7/2014 | Yamaguchi | F24F 11/006 700/297 |
| 2015/0142179 A1* | 5/2015 | Ito | F24F 11/006 700/276 |

FOREIGN PATENT DOCUMENTS

| | | |
|---|---|---|
| JP | 2005-257097 | 9/2005 |
| JP | 2006-98361 | 4/2006 |
| JP | 2008-232610 | 10/2008 |
| JP | 2009-245378 | 10/2009 |
| JP | 2011-61991 | 3/2011 |
| JP | 4796557 | 8/2011 |
| JP | 2012-65468 A | 3/2012 |
| JP | 2012065468 * | 3/2012 |
| JP | 2012-120295 | 6/2012 |
| JP | 2012-165513 A | 8/2012 |
| JP | 2012-228141 | 11/2012 |
| JP | 2012228043 A * | 11/2012 |
| WO | WO 2010/042550 A2 | 4/2010 |
| WO | WO 2012/044946 A2 | 4/2012 |
| WO | 2012/137814 | 10/2012 |

OTHER PUBLICATIONS

Examination Report dated May 28, 2015 in Singaporean Patent Application No. 2014004949.
U.S. Appl. No. 13/822,783, filed Mar. 13, 2013, Saito et al.
International Search Report dated Jul. 30, 2013 for PCT/JP2013/067707 filed on Jun. 27, 2013 with English Translation of Categories.
International Written Opinion dated Jul. 30, 2013 for PCT/JP2013/067707 filed on Jun. 27, 2013.
English-language Search Report and Written Opinion dated Aug. 14, 2014 in Singaporean Patent Application No. 2014004949.
International Search Report dated Jul. 30, 2013 in the International Application No. PCT/JP2013/067707 (English Translation only).
Office Action dated Jul. 5, 2016 in Japanese Patent Application No. 2012-270349 (with English translation).
Extended European Search Report dated Mar. 22, 2016 in Patent Application No. 13815667.4.

(56) References Cited

OTHER PUBLICATIONS

Combined Office Action and Search Report dated Jul. 6, 2016 in Chinese Patent Application No. 201380001897.3 with English translation.

* cited by examiner

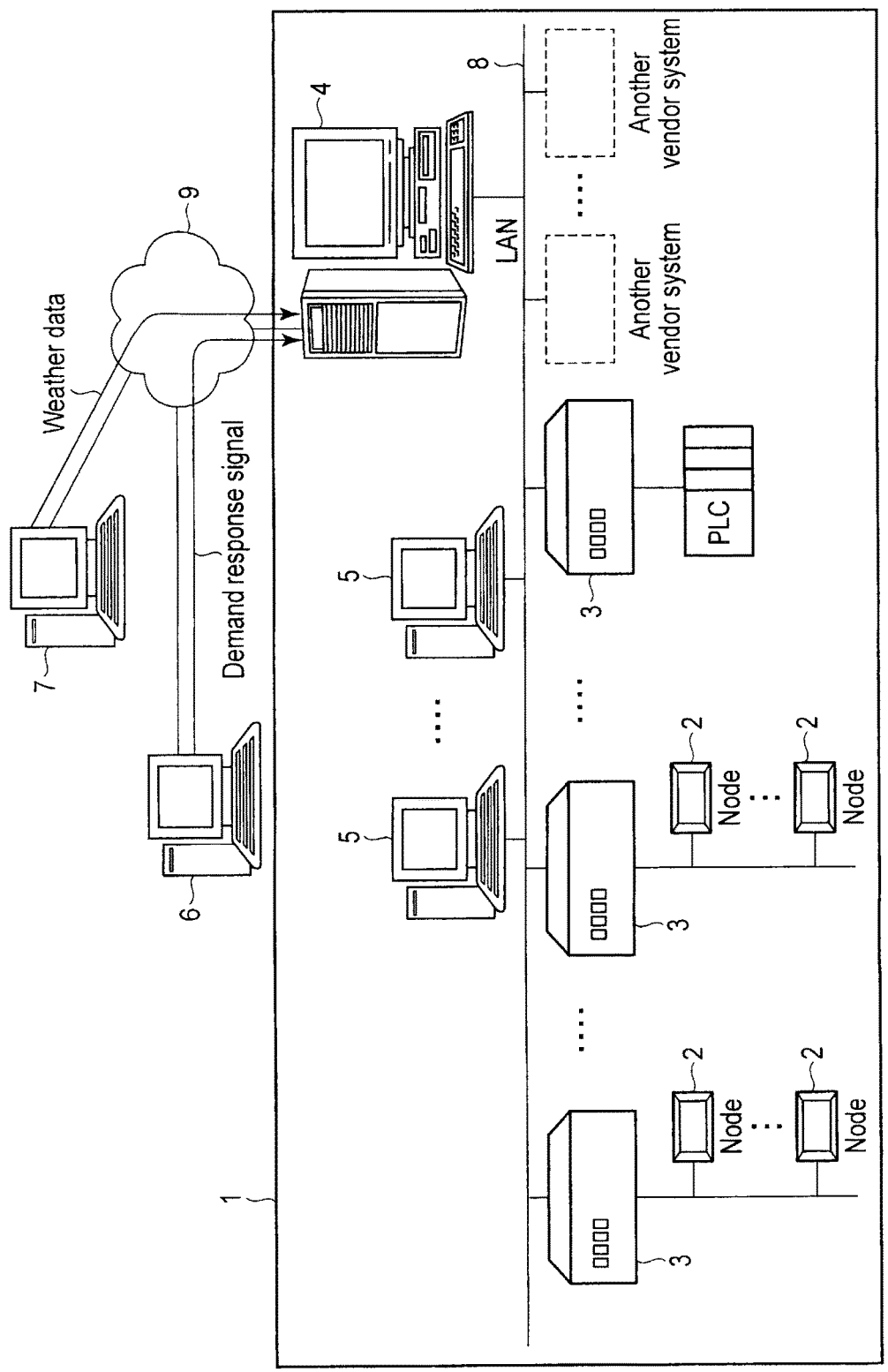
F I G. 1

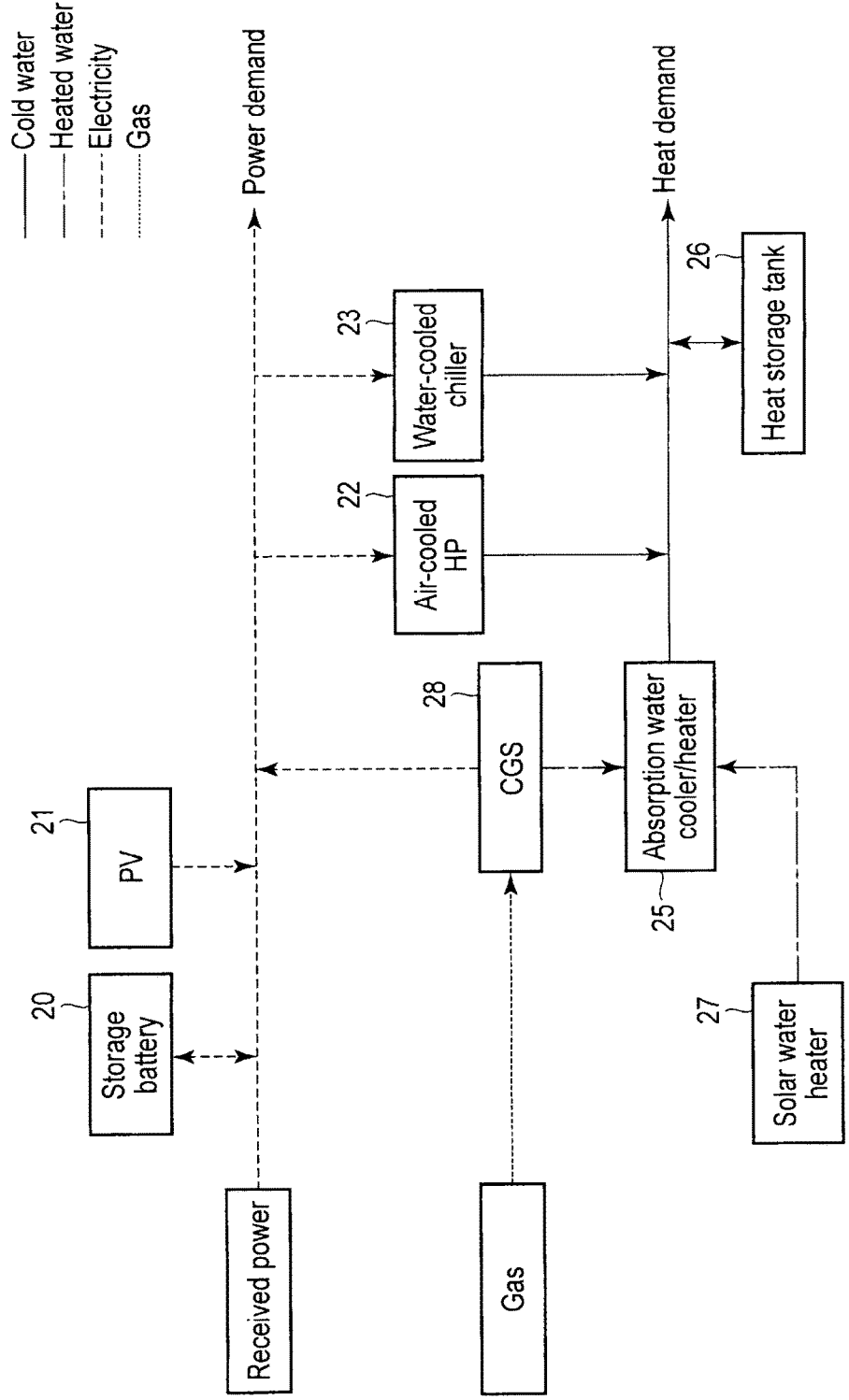
F I G. 2

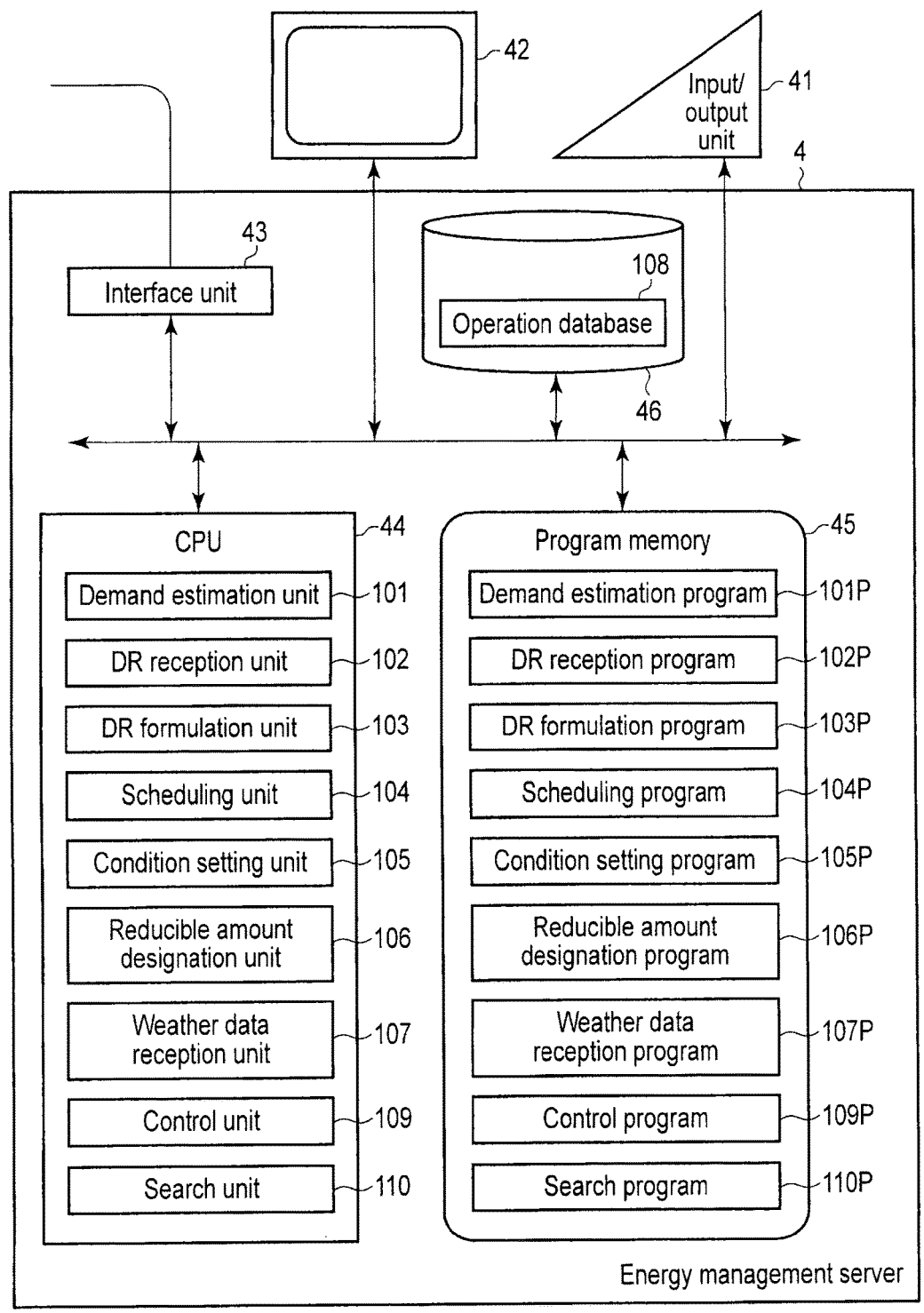
F I G. 3

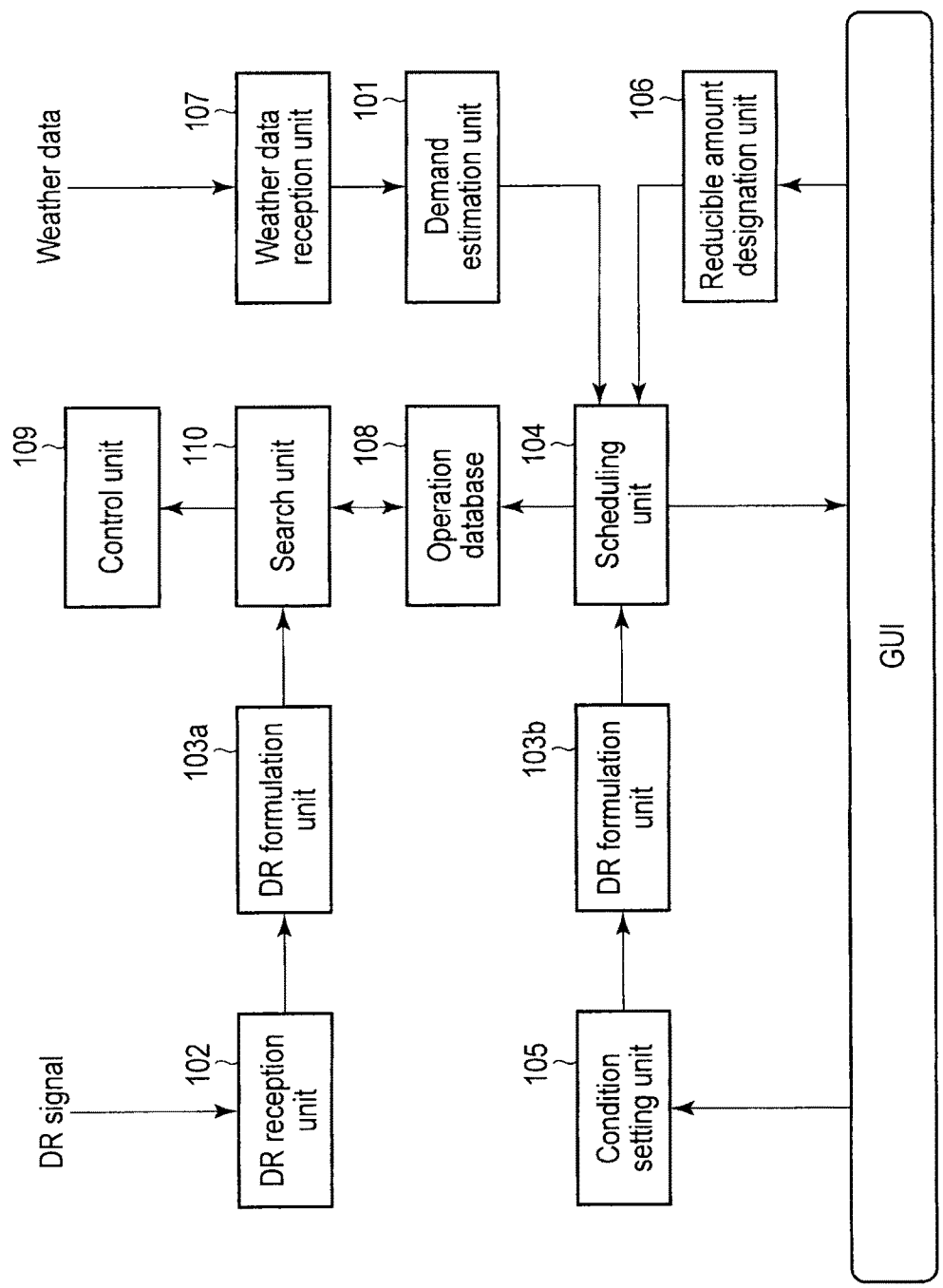
F I G. 4

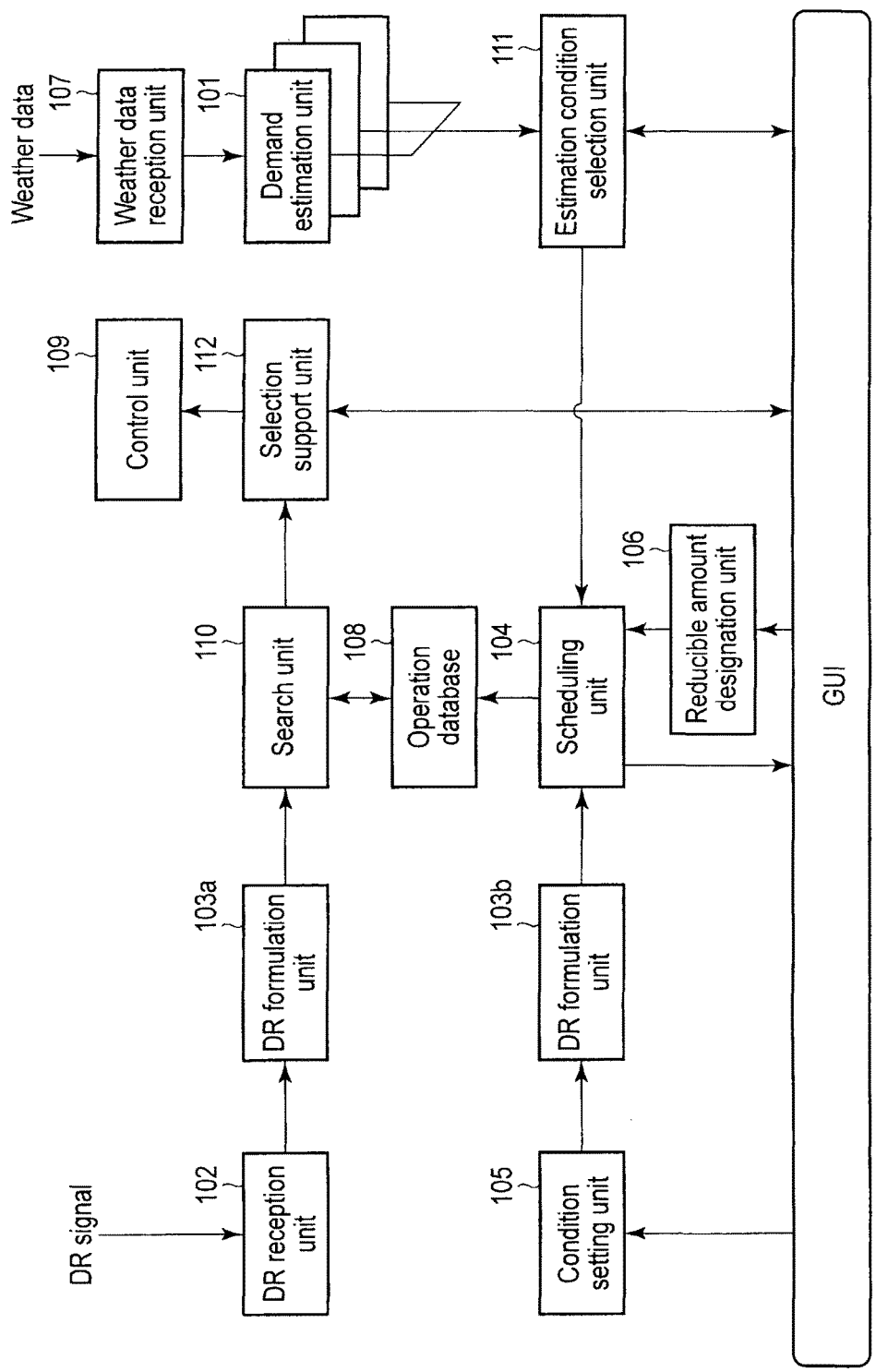
F I G. 7

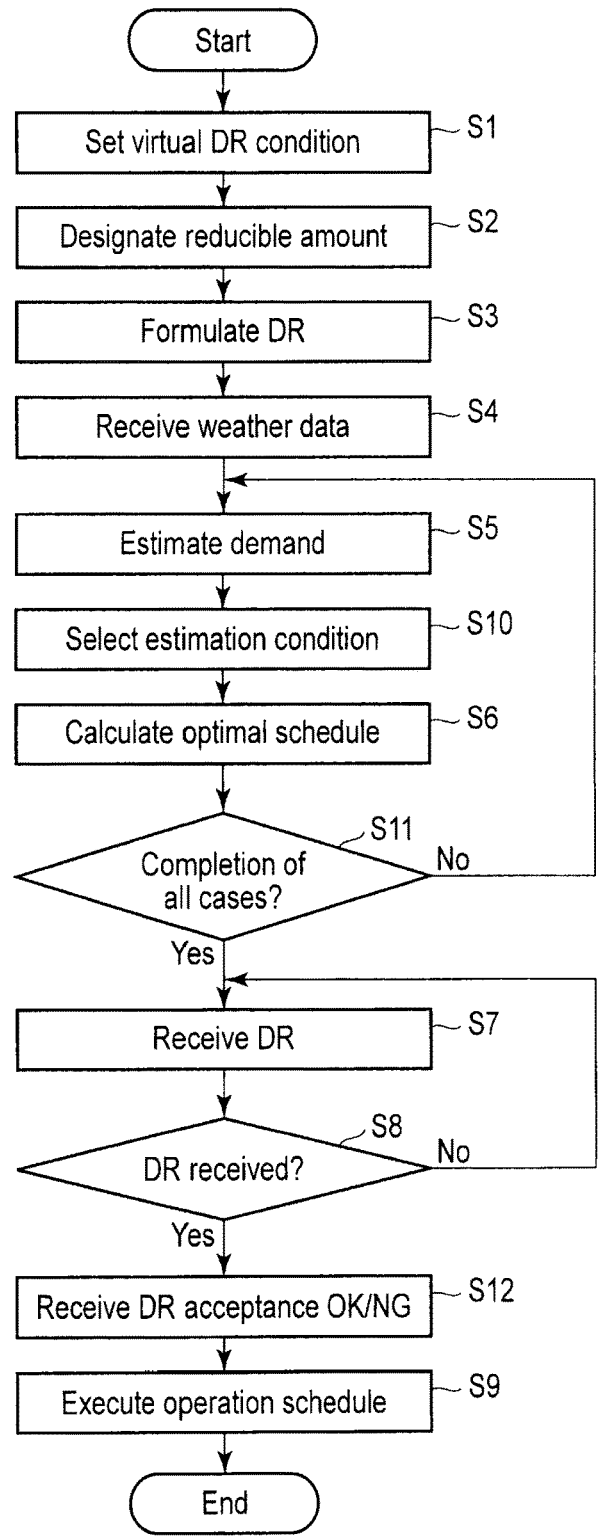
F I G. 8

ENERGY MANAGEMENT SERVER, ENERGY MANAGEMENT METHOD, AND MEDIUM

CROSS-REFERENCE TO RELATED APPLICATION

This application is a Continuation application of PCT Application No. PCT/JP2013/067707, filed Jun. 27, 2013 and based upon and claiming the benefit of priority from prior Japanese Patent Application No. 2012-270349, filed Dec. 11, 2012, the entire contents of all of which are incorporated herein by reference.

FIELD

Embodiments described herein relate generally to an energy management server, energy management method, and program for energy management in relatively large-scale constructions such as buildings and factories.

BACKGROUND

Buildings and factories consume energy in large quantities. Energy consumption of private-sector businesses is especially as large as 20% of the total. Effective energy-saving measures are required. Also, tight power supply and demand in recent years impose an upper limit of power consumption on large consumers. Hence, energy-saving technologies such as an energy consumption peak cut technique and peak shift technique have received considerable attention.

It is hoped that new energy systems such as a photovoltaic (PV) system, wind generator system, and solar heat utilization system will become popular more and more in the future. Energy storage systems such as storage batteries and accumulators, which are required to effectively utilize these energy creation systems of this type, have also received a lot of attention.

In order to effectively use energy, it is desired to control diversifying energy related systems to cooperate with each other. To this end, it is important to create an operation schedule required to organically activate an energy consumption system, energy creation system, and energy storage system. The operation schedule created by the existing method aims at energy or cost savings in a building or facility alone such as a building or factory.

A technique called demand response (DR), with which an energy supplier requires a consumer to suppress energy consumption is known. When a building or factory receives a demand response signal, it is required to change an energy-saving target value and power-saving target value, and to also change an operation schedule.

However, it is difficult to immediately change the operation schedule in response to reception of the demand response signal. One to two hours are often required for calculations required to create an operation schedule. For this reason, hours enough to determine the advisability of the created operation schedule or to complete required settings cannot be assured before execution of the operation schedule, and it is difficult to activate respective systems under an advantageous scenario.

Furthermore, it is often revealed in the middle of an operation schedule calculation process that energy cost can be further reduced by storing energy in a heat storage tank or storage battery in advance. However, as creation of the operation schedule takes longer, a time required to store energy in advance becomes shorter. Especially, since energy related systems (heat storage device, chiller, etc.) normally rise slowly, it becomes more disadvantageous as schedule creation takes longer.

As described above, with the existing technique, it is often focused to execute disadvantageous operations upon reception of the demand response signal. A technique which can solve such problems is demanded.

BRIEF DESCRIPTION OF THE DRAWINGS

FIG. 1 is a system diagram showing an example of an energy management system according to an embodiment;

FIG. 2 is a diagram showing an example of energy flows in a building 1;

FIG. 3 is a functional block diagram showing an example of an energy management server 4 according to the first embodiment;

FIG. 4 is a diagram showing data flows among function blocks shown in FIG. 3;

FIG. 7 is a diagram showing data flows among function blocks shown in FIG. 6;

FIG. 8 is a flowchart showing the processing sequence of the energy management server 4 according to the second embodiment;

DETAILED DESCRIPTION

Figure 5:
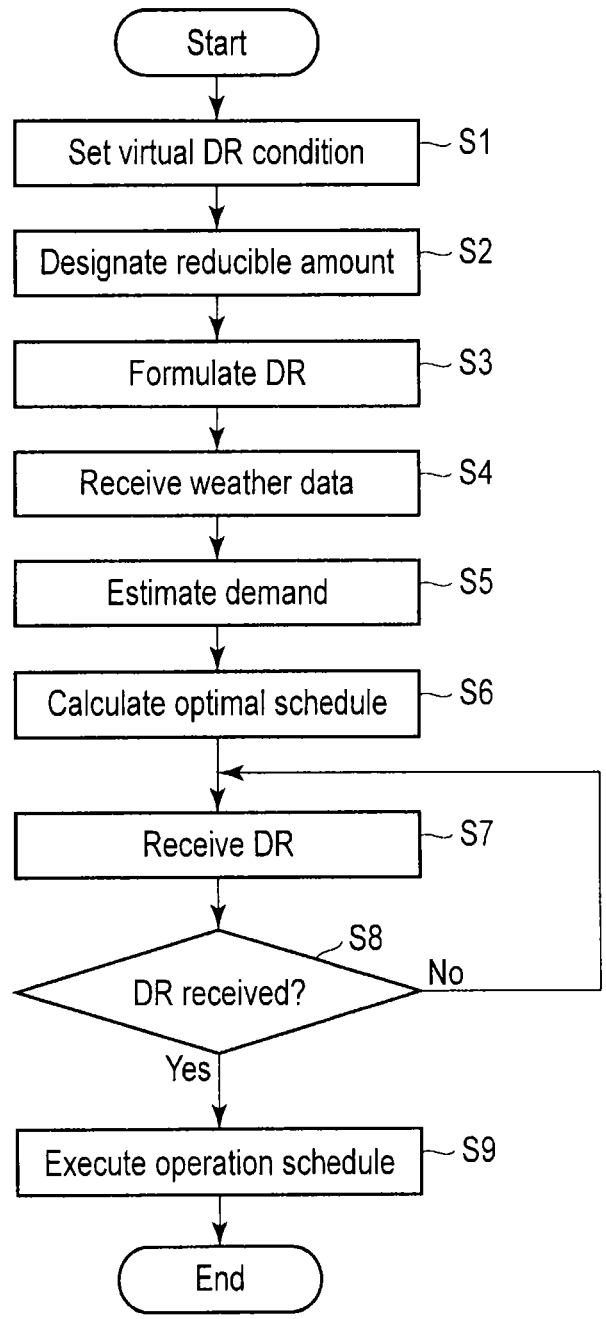
FIG. 5 is a flowchart showing the processing sequence of the energy management server 4 according to the first embodiment.

In general, according to an embodiment, an energy management server includes an estimation unit, condition setting unit, calculator, receiver, and controller. The estimation unit estimates an energy demand in a building where electrical apparatuses including an energy consumption apparatus and energy storage apparatus are equipped based on data associated with the electrical apparatuses. The condition setting unit sets a plurality of energy consumption suppression conditions. The calculator calculates an operation schedule of the electrical apparatuses which can optimize an energy balance in the building based on the energy demand and suppression condition. The receiver receives a demand response signal including an energy consumption suppression condition. The controller controls the electrical apparatuses based on an operation schedule calculated based on the suppression condition corresponding to that included in the demand response signal.

FIG. 1 is a system diagram showing an example of an energy management system according to an embodiment. Referring to FIG. 1, a building 1 as a construction includes a local area network (LAN) 8 as a communication network. Monitoring apparatuses 5, local controllers 3, and energy management server 4 are connected to the LAN 8. As an upper layer protocol of the LAN 8, for example, BACnet can be used. In this way, other vendor systems can be mixed in the system.

To each local controller 3, controlled apparatuses 2 are connected via a communication line. Each local controller 3 recognizes the connected controlled apparatuses 2 as apparatuses to be monitored, monitors states of these apparatuses, and gives various kinds of control to the apparatuses. The monitoring apparatuses 5 receive monitoring results notified from the local controllers 3, control the energy management system in an upper level, and provide various kinds of information to the user.

The controlled apparatuses 2 can include energy consumption apparatuses, energy creation apparatuses, and energy storage apparatuses. Examples of the controlled apparatuses 2 include electrical apparatuses such as air-conditioners, illumination apparatuses, power apparatuses, heat source apparatuses, heat storage apparatuses, chillers, PV systems, and storage batteries for respective floors.

The energy management server 4 mainly assumes processing related to energy management of the building 1. The energy management server 4 assumes processing for creating an activation/stop schedule of the controlled apparatuses 2 and an electric power/heat storage schedule such as electricity storage level settings based on a request (peak shift target or the like) from, for example, a building manager (user).

The energy management server 4 is connected to an Internet Protocol (IP) network 9 to receive a demand response signal (to be referred to as a DR signal hereinafter) from a host server 6 and to acquire weather data (weather forecast, temperatures of respective time zones, etc.) from a weather server 7. Note that a leased line network or the like can be used in place of the IP network.

FIG. 2 shows an example of the energy flows in the building 1. In FIG. 2, a storage battery 20, PV system 21, air cooled heat pump (HP) 22, water cooled chiller 23, absorption water cooler/heater 25, heat storage tank 26, solar water heater 27, and co generation system (CGS) 28 will be exemplified as examples of the controlled apparatuses 2. Energy exchange relations among these apparatuses will be explained. To the building 1, for example, an electric power (received power) and gas are supplied as energy sources. Using the electric power and gas as the energy sources, electricity and cold are supplied to respective sites in the building 1.

The received electric power is supplied to and stored in the storage battery 20, or is supplied to and consumed by the energy consumption apparatuses. Also, an electric power generated by the PV system 21 and CGS 28 is similarly stored in the storage battery 20 or is supplied to the energy consumption apparatuses. For example, the electric power supplied to the air-cooled HP 22 and water-cooled chiller 23 is consumed to produce cold.

The supplied gas is supplied to the CGS 28. The CGS 28 generates an electric power and heat, and supplies them onto an electric power line and heated water line. The absorption water cooler/heater 25 receives heat generated by the CGS 28 and solar water heater 27, and produces cold. Cold produced by the air-cooled HP 22, water-cooled chiller 23, and absorption water cooler/heater 25 is stored in the heat storage tank 26 or is consumed by heat demand.

FIG. 3 is a functional block diagram showing an example of the energy management server 4 according to the first embodiment. The energy management server 4 includes an input unit 41, display 42, interface unit 43, storage unit 46, central processing unit (CPU) 44, and program memory 45. That is, the energy management server 4 is a computer which functions when the CPU 44 executes programs stored in the program memory 45.

The input unit 41 is a human-machine interface (operation panel, switches, and the like) operated by the user who manages the building 1. The input unit 41 and display 42 form a graphical user interface (GUI) environment to accept information inputs from the user and to provide information to the user.

The interface unit 132 is connected to the LAN 8 and IP network 9, and assumes a communication function with the monitoring apparatus 5, local controllers 3, controlled apparatuses 2, and remote servers (host server 6, weather server 7, and the like).

The storage unit 46 stores an operation database 108 as data according to the embodiment.

The program memory 45 stores, as programs including instructions required for processing functions according to this embodiment, a demand estimation program 101P, DR reception program 102P, DR formulation program 103P, scheduling program 104P, condition setting program 105P, reducible amount designation program 106P, weather data reception program 107P, control program 109P, and search program 110P. These programs can be recorded on a removable medium (recording medium) such as a CD-ROM or can be downloaded via a communication line (including the IP network 9).

The CPU 44 loads respective programs from the program memory 45, and executes arithmetic processing by means of hardware. The CPU 44 includes, as its processing functions, a demand estimation unit 101, DR reception unit 102, DR formulation unit 103, scheduling unit 104, condition setting unit 105, reducible amount designation unit 106, weather data reception unit 107, control unit 109, and search unit 110.

The demand estimation unit 101 estimates, for example, values per hour of an energy demand and energy product in the building 1, where the controlled apparatuses 2 are equipped, based on data associated with the controlled apparatuses 2. The data associated with the controlled apparatuses 2 can include, for example, information of characteristics (consumed power and the like), operation settings, and manipulation settings of the respective controlled apparatuses 2, the capacity of the storage battery 20, electric power generation characteristics of the PV system 21, and the like.

The DR reception unit 102 receives a DR signal. The DR signal is normally provided by the host server 6 via the IP network 9 at regular or random intervals. The DR signal includes information of a type of that DR signal, time zones in which power consumption is required to be suppressed, incentive, power consumption baseline, and the like. In this embodiment, the information included in the DR signal will be generically referred to as an energy consumption suppression condition.

The DR formulation unit 103 formulates the suppression condition included in the received DR signal to create a formula which can be used in the arithmetic processing. For example, a DR signal of a type called a peak-time rebate (PTR) includes a rule (suppression condition) that an incentive is paid for a reduction amount from a baseline of a received power amount in a certain time zone. This suppression condition included in the DR signal can be expressed by time zone-dependent electricity charges, time zone-dependent incentives, and time zone-dependent baselines.

The scheduling unit 104 calculates an operation schedule of the controlled apparatuses 2, which can optimize an energy balance in the building 1, based on the energy demand, energy product, and formulated suppression condition. The operation schedule can include information of settings, active times, active periods, and the like upon activating the respective controlled apparatuses 2. Although various points of view of optimization may be adopted, for example, those of energy savings, cost savings, CO2 emission reductions, and the like may be adopted.

The condition setting unit 105 sets a plurality of different energy consumption suppression conditions before arrival of a DR signal. The set suppression conditions are provided for the DR formulation unit 103. That is, the condition setting unit 105 provides information (suppression condition) which imitates a DR signal to the DR formulation unit 103 independently of reception of the DR signal.

For example, suppression conditions which assume each and every cases in permutations and combinations can be supplied. The scheduling unit 104 generates an operation schedule based on a suppression condition included in this imitated DR signal. A signal which imitates a DR signal will be referred to as a virtual DR signal hereinafter, and a suppression condition included in the virtual DR signal will be referred to as a virtual DR condition hereinafter.

The DR formulation unit 103 executes formulation processing even in a case in which it receives a virtual DR signal in the same manner as in a case in which it receives a DR signal. Likewise, the scheduling unit 104 generates an operation schedule based on the formulated suppression condition. A plurality of operation schedules generated based on multiple suppression conditions are stored in the operation database 108.

For example, an operation schedule which targets at cost savings can be generated by minimizing an object function C given by:

$$C = \Sigma \{k_i \times L_i - m_i \times (L_i - B_i) + n_i \times P_i\}$$

$$i = 1 \sim 24 \quad (1)$$

C: cost during operation period
$k_i$: electricity charge at time i
$L_i$: received power amount at time i
$m_i$: incentive at time i
$B_i$: baseline at time i
$n_i$: gas charge at time i
$P_i$: consumed gas at time i
i: elapsed time (hours) from 0 hours According to formula (1), a total cost reduction including a gas charge in addition to an electricity charge can be attained.

The reducible amount designation unit 106 is an interface required to receive designation of a reducible amount of energy consumed by the energy consumption apparatuses. For example, an energy consumption amount can be reduced by voluntarily turning off the illumination apparatuses. The energy manager (user) of the building 1 can input a power consumption reducible amount via the reducible amount designation unit 106. If the building 1 is a factory, the user may input a power consumption reducible amount in manufacturing facilities and the like.

Letting $S_i$ be a power consumption reducible amount and $D_i$ be a time zone-dependent consumed power (fixed value), we have:

$$L_i = S_i + D_i \quad (2)$$

where index i indicates a time zone.

The weather data reception unit 107 acquires weather data from the weather server 7 at regular or random intervals. The acquired weather data can be used to calculate an operation schedule.

The control unit 109 generates a control signal required to control the controlled apparatuses 2 based on the operation schedule generated by the scheduling unit 104. This control signal is supplied to the controlled apparatuses 2 via the LAN 8 and local controllers 3, thus implementing activation control based on the operation schedule.

Upon reception of a DR signal, the search unit 110 reads out an operation schedule corresponding to a suppression condition included in this DR signal from the operation database 108. That is, the search unit 110 searches the operation database 108 using the suppression condition included in the received DR signal as a key, and passes a hit operation schedule to the control unit 109. The control unit 109 controls the controlled apparatuses 2 based on this operation schedule. Operations based on the aforementioned arrangement will be described below.

FIG. 4 shows the data flows among the function blocks shown in FIG. 3. Note that FIG. 4 shows two DR formulation units 103a and 103b, both of which are function objects having the same function as the DR formulation unit 103 shown in FIG. 3. For example, DR formulation units 103a and 103b can be understood as a plurality of threads generated during progress of the program.

In FIG. 4, the demand estimation unit 101 estimates an energy demand (for example, a power demand, heat demand, and the like) of the building 1 based on the weather data acquired by the weather data reception unit 107 and the data associated with the controlled apparatuses 2. The estimated energy demand is passed to the scheduling unit 104.

On the other hand, the condition setting unit 105 passes a virtual DR condition input by the user using the GUI for DR formulation unit 103b as a virtual DR signal. The condition setting unit 105 passes a virtual DR signal including a virtual DR condition to DR formulation unit 103b irrespective of reception of a DR signal in the DR reception unit 102. DR formulation unit 103b formulates the suppression condition included in the virtual DR signal, and passes an obtained formula to the scheduling unit 104.

The reducible amount designation unit 106 passes a power consumption reducible amount input by the user using the GUI for the scheduling unit 104.

The scheduling unit 104 solves an optimization problem that minimizes the object function C so as to optimize an energy balance in the building 1 based on the formulated suppression condition and energy demand. In order to solve the optimization problem, for example, an existing method such as a genetic algorithm can be used. Upon solving the optimization problem, a time zone-dependent consumed power $D_i$, which does not depend on the reducible amount designation unit 106, is preferably calculated in advance.

The scheduling unit 104 calculates an operation schedule of the controlled apparatuses 2 based on the virtual DR condition. The calculated operation schedule is stored in the operation database 108. This operation schedule may be displayed on the GUI.

Then, upon reception of a DR signal, the DR reception unit 102 passes the received DR signal to DR formulation unit 103a. DR formulation unit 103a formulates a suppression condition included in the DR signal, and passes an obtained formula to the search unit 110. The search unit 110 searches the operation database 108 based on this formula, and acquires an operation schedule calculated based on a virtual DR condition which reflects this formula. The acquired operation schedule is passed to the control unit 109, and is used to control the controlled apparatuses 2.

FIG. 5 is a flowchart showing the processing sequence of the energy management server 4 according to the first embodiment. The energy management server 4 accepts a setting of a virtual DR condition and designation of a reducible amount by the user (step S1, step S2). After these pieces of information are input, DR formulation units 103a and 103b formulate suppression conditions respectively included in a DR signal and virtual DR signal, and pass the formulas to the scheduling unit 104 (step S3).

The energy management server 4 provides received weather data (step S4) to the demand estimation unit 101. The demand estimation unit 101 estimates a power demand and heat demand based on the weather data and data of the controlled apparatuses 2 (step S5). This estimation result is input to the scheduling unit 104, which generates an operation schedule of the controlled apparatuses 2.

With the sequence described so far, an operation schedule based on a virtual DR signal is calculated. The calculated operation schedule is stored in the operation database 108. Note that the sequence of steps S1 to S6 can be repeated many times by changing a virtual DR condition.

Next, the DR reception unit 102 waits for arrival of an external DR signal (step S7, step S8). If the DR reception unit 102 cannot confirm arrival of a DR signal (No in step S8), it confirms a DR signal again after an elapse of a prescribed time. If reception of a DR signal can be confirmed, the energy management server 4 executes an operation schedule prepared in advance based on a suppression condition included in the received DR signal (step S9).

Until step S9 is reached, an operation schedule has already been calculated under a suppression condition which matches or is close to that included in the received DR signal. Therefore, the energy management server 4 can start execution of an operation schedule corresponding to a suppression condition immediately after reception of a DR signal.

As described above, according to the first embodiment, before a DR signal arrives, virtual DR signals, that is, pieces of information which imitate various energy suppression conditions are provided for the energy management server 4. The energy management server 4 generates a plurality of operation schedules based on virtual DR signals before arrival of a DR signal. Thus, a plurality of scenarios that assume every DR signals can be set and generated in advance. Therefore, a time required to determine advisability of an operation schedule used in actual operations and a setting time required to generate an operation schedule can be assured.

That is, according to the first embodiment, upon reception of a DR signal, the controlled apparatuses 2 can be immediately controlled based on the already calculated operation schedule. Thus, a lead time until the beginning of activation of especially an apparatus which is difficult to be quickly activated such as a heat energy related apparatus can be shortened. Furthermore, the controlled apparatuses 2 can be activated under maximally advantageous conditions.

As described above, according to the first embodiment, an energy management server, energy management method, and program, which can immediately start control based on an advantageous operation schedule in response to reception of a demand response signal can be provided.

Second Embodiment

Figure 6:
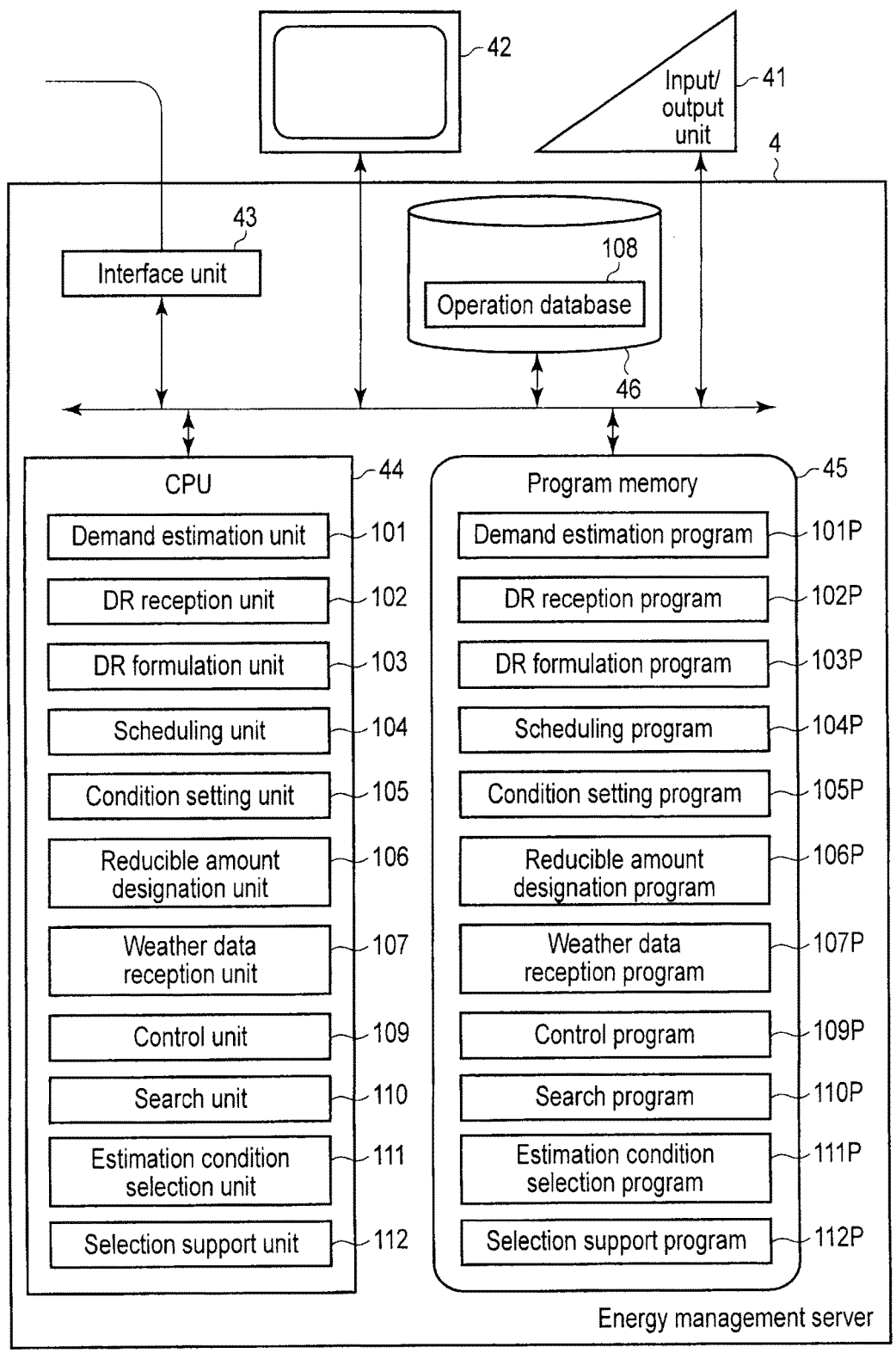
FIG. 6 is a functional block diagram showing an example of an energy management server 4 according to the second embodiment.

FIG. 6 is a functional block diagram showing an example of an energy management server 4 according to the second embodiment. In FIG. 6, the same reference numbers denote parts common to FIG. 3, and only different parts will be described in this embodiment.

In FIG. 6, a program memory 45 includes an estimation condition selection program 111P and selection support program 112P. These programs implement functions of an estimation condition selection unit 111 and selection support unit 112 in a CPU 44.

The estimation condition selection unit 111 is an interface which prompts the user to select a desired demand estimation from a plurality of energy demand estimations. The selection support unit 112 is an interface which prompts the user to select one operation schedule to be executed from a plurality of operation schedules output from a scheduling unit 104.

FIG. 7 shows the data flows among the function blocks shown in FIG. 6. A plurality of demand estimation units 101 shown in FIG. 7 have similar function as in the first embodiment.

In FIG. 7, weather data received by a weather data reception unit 107 is passed to the demand estimation units 101. The demand estimation units 101 calculate a plurality of energy demand estimations based on different criteria on the basis of the weather data and data of controlled apparatuses 2. For example, by applying a technique for calculating a demand estimation by a learning function of a computer, different data sets are used as data to be learned, thereby obtaining different demand estimation results for the same weather data.

As criteria of preparation of different data sets, a predicted mean vote (PMV) as a comfort evaluation index associated with air-conditioning control can be used. The PMV is specified by ISO 7730, and is a value calculated from a temperature, humidity, wind velocity, amount of clothing, radiation temperature, and amount of activity. When the PMV value falls within a range of ±0.5, about 90% persons feel comfort. As the PMV value is larger, people feel hotter; as the value is smaller, people feel colder.

As different data sets, four data sets of different PMV values are assumed. These data sets are respectively distinguished by [A], [B], [C], and [D], and respectively assume, for example, the following PMV ranges.

Data set [A]: PMV range of 0.4 or less
Data set [B]: PMV range from 0.4 to 0.6
Data set [C]: PMV range from 0.6 to 1.0
Data set [D]: PMV range of 1.0 or more The demand estimation units 101 calculates energy demand estimations for respective data sets. These demand estimations are supplied to the estimation condition selection unit 111.

The estimation condition selection unit 111 displays these plurality of demand estimations on a GUI in a menu form or the like, and prompts the user to make, for example, a selection operation such as a click operation. At least one selected demand estimation is passed to the scheduling unit 104, and an operation schedule is calculated in the same manner as in the first embodiment. Note that both an operation schedule which considers a virtual DR signal and that which does not consider any DR signal may be calculated. The calculated operation schedule is stored in an operation database 108.

Upon arrival of a DR signal, a formula which expresses a suppression condition included in this DR signal is passed to a search unit 110. The search unit 110 searches the operation database 108 based on this formula, and acquires operation schedules calculated under a virtual DR condition which reflects this formula for a plurality of estimation conditions. The acquired operation schedules for respective estimation conditions are passed to the selection support unit 112.

The selection support unit 112 displays the operation schedules for respective estimation conditions on the GUI.

The operation schedule selected by the user is passed to a control unit 109. The control unit 109 controls the controlled apparatuses 2 based on the schedule of the user's choice.

FIG. 8 is a flowchart showing the processing sequence of the energy management server 4 according to the second embodiment. In FIG. 8, the same step numbers denote processes common to FIG. 5, and only different processes will be described in this embodiment. After a plurality of demand estimations are calculated in step S5, the estimation condition selection unit 111 displays the calculated demand estimations on the GUI, and waits for user's selection (step S10). If the user selects one demand condition, an operation schedule is calculated based on the selected demand estimation (step S6). The processes of steps S5, S10, and S6 are repeated until the user's selection operations are complete, that is, until a completion instruction of all cases is input (Yes in step S11).

After operation schedules as many as the number of selected demand estimations are calculated, when a DR signal is received, an operation schedule corresponding to that DR signal is passed to the selection support unit 112. The selection support unit 112 displays a plurality of operation schedules on the GUI, and prompts the user to select an operation schedule (step S12). Then, control based on the selected operation schedule is started (step S9).

Figure 9:
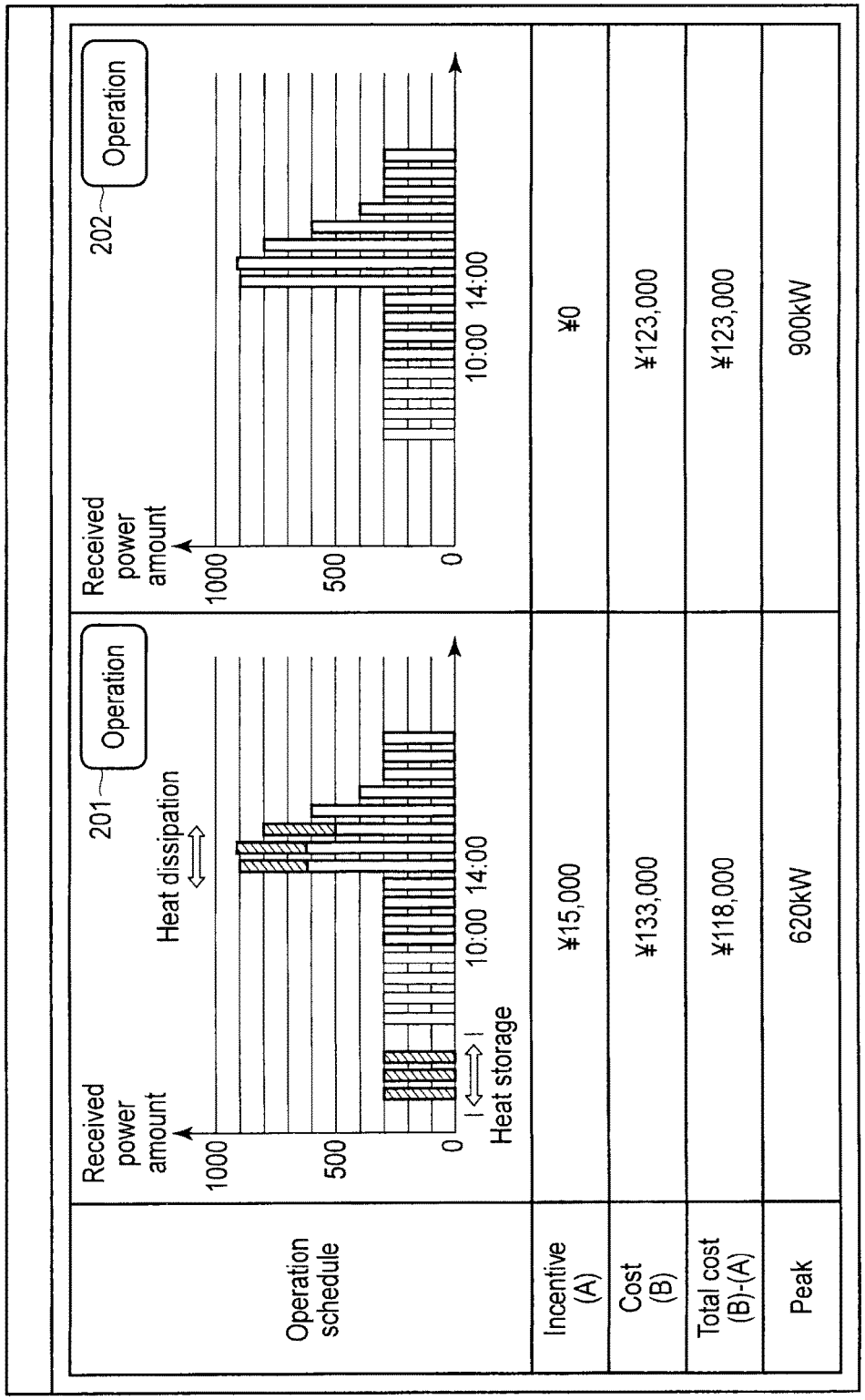
FIG. 9 is a view showing an example of a schedule selection screen, which is displayed on a display 42 according to the second embodiment.

FIG. 9 shows an example of a schedule selection screen displayed on the GUI according to the second embodiment. This screen is displayed on a display 42 in step S12 of FIG. 8. Two different operation schedules are displayed on the right and left sides of the screen. Operation buttons 201 and 202 having different signs are displayed in association with the operation schedules.

The schedule corresponding to the operation button 201 considers a DR signal, and that corresponding to the operation button 202 does not consider any DR signal. Note that a plurality of schedules which consider DR signals may be displayed in correspondence with a plurality of demand estimations in some cases. However, FIG. 9 shows only one schedule.

Incentive, cost, total cost, and peak power values are displayed together for respective operation schedules. Each operation schedule represents the relationship between heat storage and heat dissipation energy amounts, and received power amounts.

On the left schedule in FIG. 9, an incentive of 15000 yen is receivable by executing heat storage and heat dissipation, but a cost of 133000 yen is required, and a total cost amounts to 118000 yen. The right schedule indicates a case in which heat storage and heat dissipation are not executed based on DR, and a total cost amounts to 123000 yen.

The user who prioritizes a cost reduction selects the left schedule, and clicks the operation button 201 to inform the system of his or her intention. Thus, control based on the operation schedule which considers DR is started.

Note that peaks of received power amounts for respective schedules are displayed together. A peak power of the left schedule is 620 kW, and that of the right schedule is 900 kW. When a received power amount is limited, this numerical value can be used as a reference. Note that the cost and peak power displayed on this screen are assumed values when the corresponding operation is executed, and are calculation values calculated by the scheduling unit 104.

According to the second embodiment, a plurality of operation schedules are calculated, and are presented to the user. The plurality of operation schedules can include a schedule in a normal operation state which does not assume a DR signal, and that which assumes arrival of a DR signal.

Also, the plurality of operation schedules can include a plurality of schedules corresponding to a plurality of energy demand estimations based on a plurality of criteria. The user can select one of the presented operation schedules and, hence, the user's intention can be reflected to control of the controlled apparatuses 2.

Note that the present invention is not limited to the aforementioned embodiments.

Figure 10:
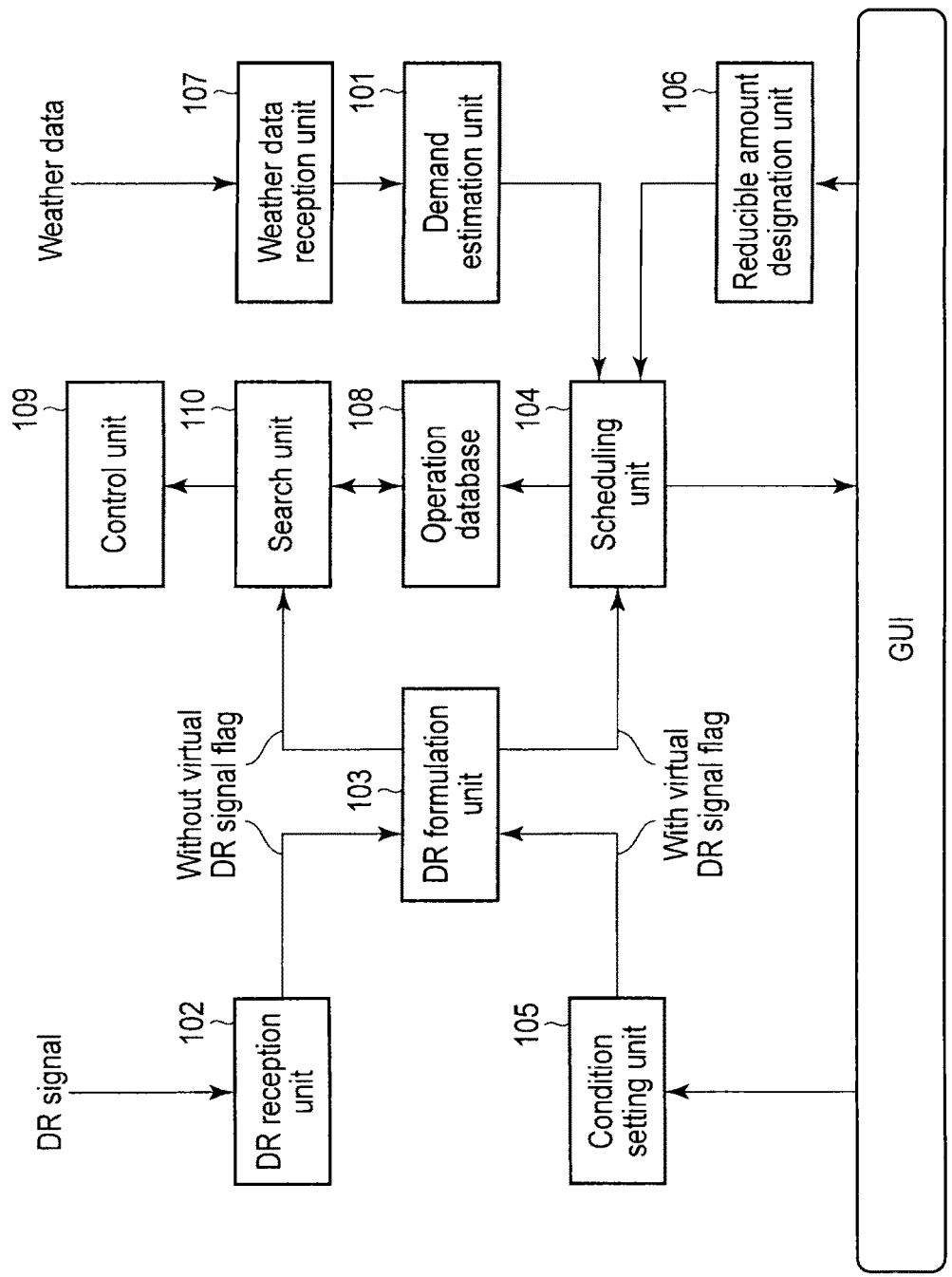
FIG. 10 is a diagram showing another example of data flows among function blocks shown in FIG. 3.

FIG. 10 shows another example of the data flows among the function blocks shown in FIG. 3. FIG. 10 shows the DR formulation unit 103, which is shown as DR formulation units 103a and 103b in FIG. 4, as one object (thread). This DR formulation unit 103 assumes two processes of formulation of a suppression condition included in an actual DR signal, and that of a suppression condition included in a virtual DR signal. Hence, the actual DR signal and virtual DR signal can be distinguished from each other using, for example, a flag.

A DR signal without any flag indicating a virtual DR signal is handled as an actual DR signal, and a formula which represents its suppression condition is passed to the search unit 110. A DR signal with the flag indicating a virtual DR signal is handled as a virtual DR signal, and a formula which represents its suppression condition is passed to the scheduling unit 104. In this manner, the same operations as in the first embodiment can be attained.

Also, at least any of the demand estimation unit 101, DR reception unit 102, DR formulation unit 103, scheduling unit 104, condition setting unit 105, reducible amount designation unit 106, weather data reception unit 107, operation database 108, control unit 109, search unit 110, condition selection unit 111, and selection support unit 112 may be implemented on a cloud computing system. Programs which implement the functions of these function blocks may be installed in a single computer or may be installed while being distributed to a plurality of computers. How to implement these function objects in a system can be understood by those who are skilled in the art.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes may be made without departing from the spirit of the inventions. The accompanying claims and their equivalents are intended to cover such forms or modifications as would fall within the scope and spirit of the inventions.

What is claimed is:

1. An energy management server comprising:
   an estimator configured to estimate an energy demand in a building where electrical apparatuses including an energy consumption apparatus and an energy storage apparatus are equipped based on data associated with the electrical apparatuses;
   a setter configured to set a plurality of virtual demand response signals which include different information respectively;
   a calculator configured to calculate for each of the information included in each of the set virtual demand response signals, an operation schedule of the electrical apparatuses, which is configured to optimize an energy balance in the building, based on the energy demand prior to reception of an actual demand response signal which is sent from a server;

a database configured to store the operation schedule calculated for each of the information included in each of the set virtual demand response signals;

a receiver configured to receive the actual demand response signal from the server;

a searcher configured to read out, from the database, an operation schedule calculated based on one of the information corresponding to the information which is included in the received actual demand response signal; and a controller configured to control the electrical apparatuses based on the read out operation schedule.

2. The energy management server of claim 1, wherein the electrical apparatuses include an energy production apparatus, the estimator estimates an energy product by the energy production apparatus, and the calculator calculates the operation schedule based on the energy product.

3. The energy management server of claim 1, further comprising a designator configured to accept designation of a reducible amount of energy consumed by the energy consumption apparatus, wherein the calculator calculates the operation schedule based on the designated reducible amount.

4. The energy management server of claim 1, further comprising a weather data receiver configured to receive weather data, wherein the calculator calculates the operation schedule based on the weather data.

5. The energy management server of claim 1, wherein the estimator estimates a plurality of energy demands based on different criteria, and the calculator calculates a plurality of operation schedules based on the plurality of estimated energy demands.

6. The energy management server of claim 5, further comprising an interface unit configured to prompt a user to designate one of the plurality of operation schedules, wherein the controller controls the electrical apparatuses based on the operation schedule designated via the interface unit.

7. The energy management server of claim 6, wherein the interface unit visually displays the plurality of operation schedules and at least one of the time zone and the incentive corresponding to the respective operation schedules.

8. The energy management server of claim 6, wherein the interface unit visually displays the plurality of operation schedules and peak values of received power amounts corresponding to the respective operation schedules.

9. The energy management server of claim 1, further comprising a formulater configured to formulate the information included in each of the set virtual demand response signals to create a formula, wherein the calculator calculates the operation schedule based on the formula.

10. An energy management method comprising:

estimating an energy demand in a building where electrical apparatuses including an energy consumption apparatus and an energy storage apparatus are equipped based on data associated with the electrical apparatuses;

setting a plurality of virtual demand response signals which include different information respectively;

calculating for each of the information included in each of the set virtual demand response signals, an operation schedule of the electrical apparatuses, which is configured to optimize an energy balance in the building, based on the energy demand prior to reception of an actual demand response signal which is sent from a server;

storing the operation schedule calculated for each of the information included in each of the set virtual demand response signals, in a database;

receiving the actual demand response signal from the server;

reading out, from the database, an operation schedule calculated based on one of the information corresponding to the information which is included in the received actual demand response signal; and controlling the electrical apparatuses based on the read out operation schedule.

11. The energy management method of claim 10, wherein the electrical apparatuses include an energy production apparatus, and the method further comprising estimating an energy product by the energy production apparatus, and calculating the operation schedule based on the energy product.

12. The energy management method of claim 10, further comprising accepting designation of a reducible amount of energy consumed by the energy consumption apparatus, and calculating the operation schedule based on the designated reducible amount.

13. The energy management method of claim 10, further comprising receiving weather data, and calculating the operation schedule based on the weather data.

14. The energy management method of claim 10, further comprising estimating a plurality of energy demands based on different criteria, and calculating a plurality of operation schedules based on the plurality of estimated energy demands.

15. The energy management method of claim 14, further comprising prompting a user to designate one of the plurality of operation schedules, and controlling the electrical apparatuses based on the designated operation schedule.

16. The energy management method of claim 10, further comprising formulating the information included in each of the set virtual demand response signals to create a formula, wherein the calculating calculates the operation schedule based on the formula.

17. A non-transitory computer-readable medium storing a program executed by a computer, the program comprising:

estimating an energy demand in a building where electrical apparatuses including an energy consumption apparatus and an energy storage apparatus are equipped based on data associated with the electrical apparatuses;

setting a plurality of virtual demand response signals which include different information respectively;

calculating for each of the information included in each of the set virtual demand response signals, an operation schedule of the electrical apparatuses, which is configured to optimize an energy balance in the building, based on the energy demand prior to reception of an actual demand response signal which is sent from a server;

storing the operation schedule calculated for each of the information included in each of the set virtual demand response signals, in a database;

receiving the actual demand response signal from the server;

reading out, from the database, an operation schedule calculated based on one of the information corresponding to the information which is included in the received actual demand response signal; and controlling the electrical apparatuses based on the read out operation schedule.

18. The medium of claim 17, wherein the electrical apparatuses include an energy production apparatus, and the program further comprising estimating an energy product by the energy production apparatus, and calculating the operation schedule based on the energy product.

19. The medium of claim 17, wherein the program further comprising accepting designation of a reducible amount of energy consumed by the energy consumption apparatus, and calculating the operation schedule based on the designated reducible amount.

20. The medium of claim 17, wherein the program further comprising receiving weather data, and calculating the operation schedule based on the weather data.

21. The medium of claim 17, wherein the program further comprising estimating a plurality of energy demands based on different criteria, and calculating a plurality of operation schedules based on the plurality of estimated energy demands.

22. The medium of claim 21, wherein the program further comprising prompting a user to designate one of the plurality of operation schedules, and controlling the electrical apparatuses based on the designated operation schedule.

23. The medium of claim 17, wherein the program further comprising formulating the information included in each of the set virtual demand response signals to create a formula, wherein the calculating calculates the operation schedule based on the formula.

* * * * *